Sept. 24, 1929.  E. KLAHN  1,729,112
PASTRY MAKING MACHINE
Filed April 14, 1928  4 Sheets-Sheet 1
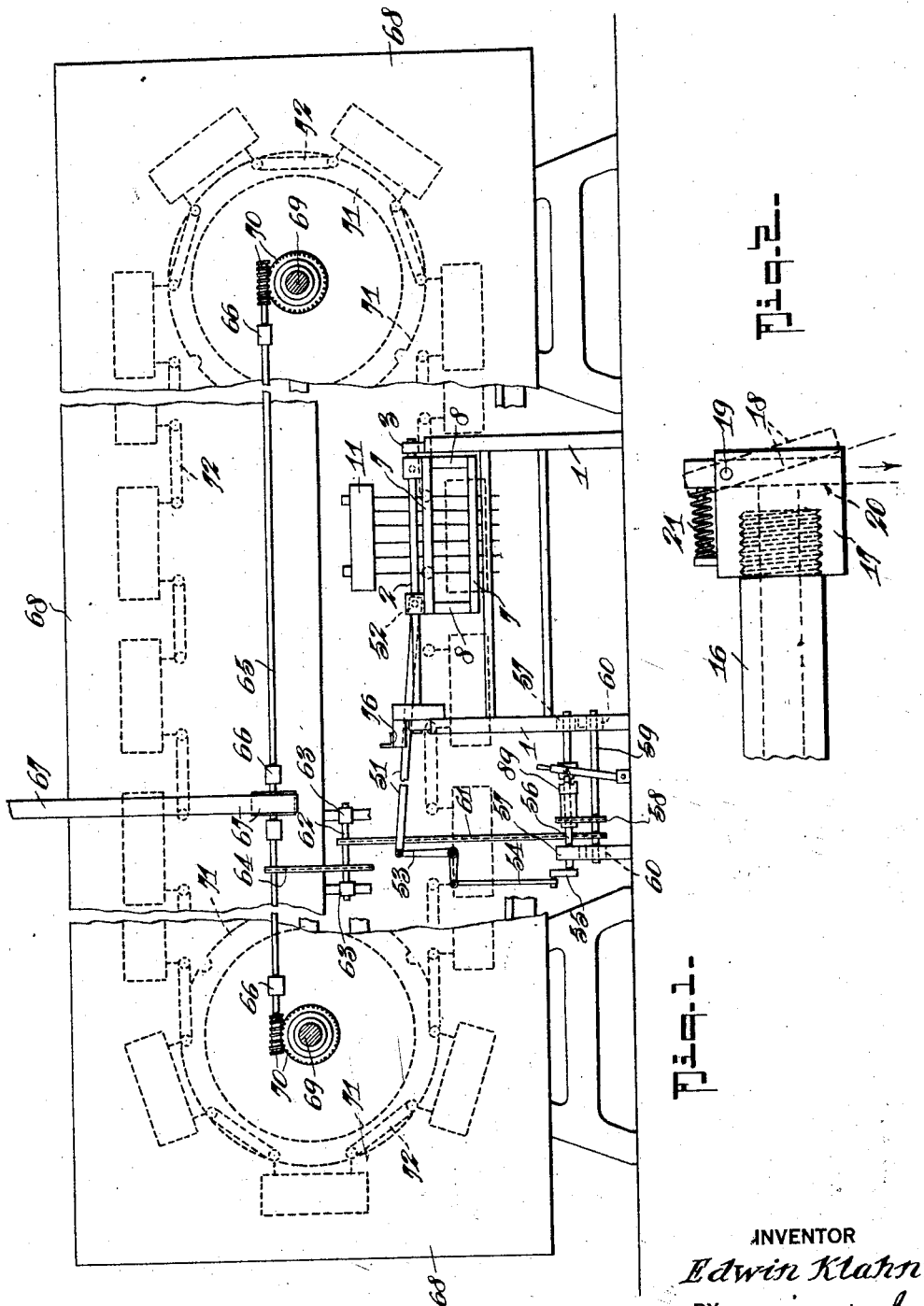
INVENTOR
*Edwin Klahn.*
BY
*Albert Dietrich*
ATTORNEY

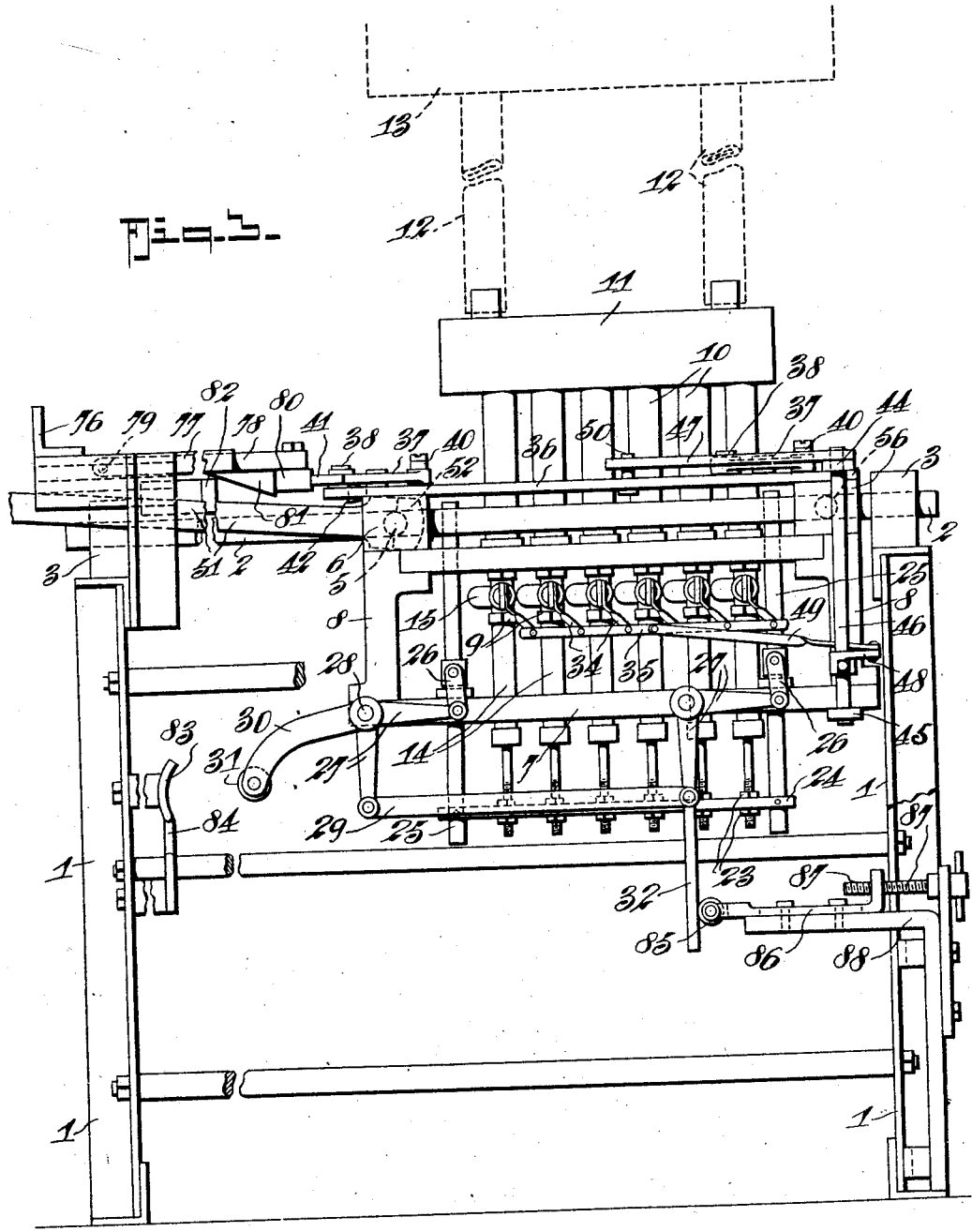

Sept. 24, 1929.  E. KLAHN  1,729,112
PASTRY MAKING MACHINE
Filed April 14, 1928  4 Sheets-Sheet 3
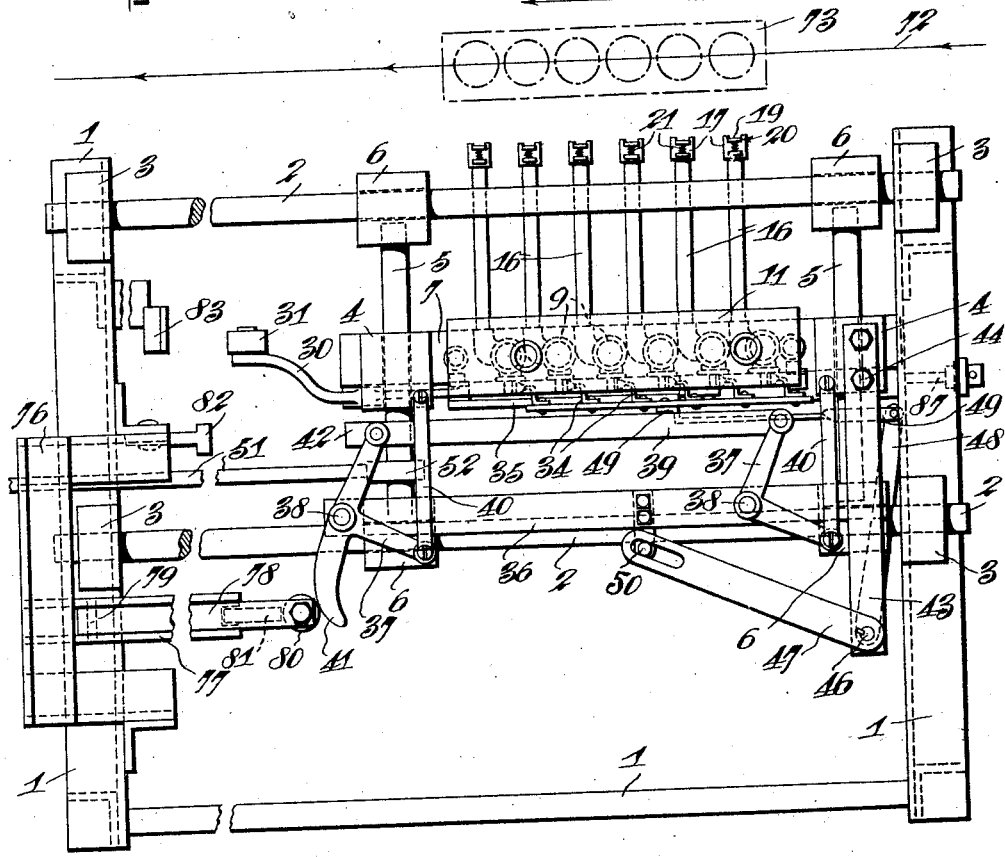
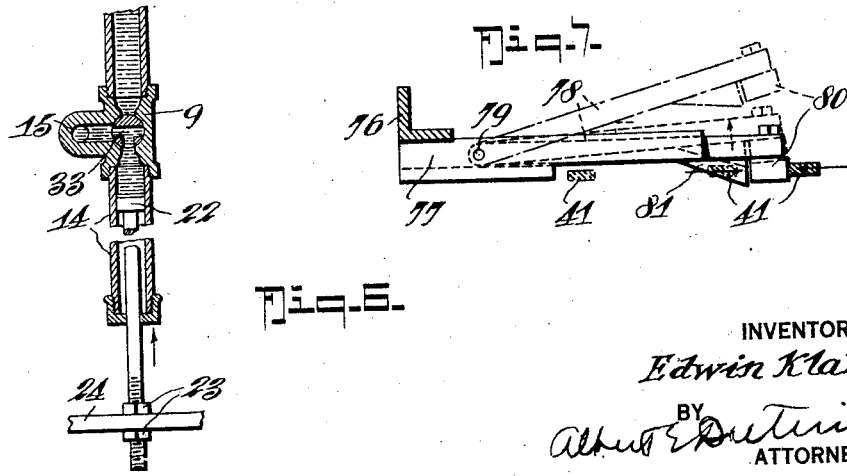
INVENTOR
Edwin Klahn.
BY
ATTORNEY Sept. 24, 1929.  E. KLAHN  1,729,112
PASTRY MAKING MACHINE
Filed April 14, 1928  4 Sheets-Sheet 4

INVENTOR
*Edwin Klahn*
BY
*Albert E. Dutinch*
ATTORNEY

Patented Sept. 24, 1929

1,729,112

UNITED STATES PATENT OFFICE

EDWIN KLAHN, OF PORT CHESTER, NEW YORK, ASSIGNOR TO FANNIE ALEXANDER AND MORRIS D. KOPPLE, OF NEW YORK, N. Y.

PASTRY-MAKING MACHINE

Application filed April 14, 1928. Serial No. 269,956.

My invention relates to the art of automatic machines for the manufacture of cup pastry such as ice cream cones, pattie cups, etc. Heretofore machines have been provided for the manufacture of such articles, such machines consisting, in general, of a movable carrier for the mold units (such as a rotary table carrier, a "Ferris wheel" carrier, or an endless chain carrier) whereby the mold units are carried successively from a charging station through a heating or baking station or stations to a discharging station and back again to the charging station to complete the cycle of operations. Usually there is located at the charging station a relatively fixedly placed charging mechanism comprising a batter reservoir, a pump and distributing nozzles with means for operating the pump and nozzles as the mold units are brought beneath the nozzles to deposit charges of batter into the mold cavities.

Heretofore, also, in order to enable the charges to be centrally deposited into the mold cavities, the carrier has usually been given a step-by-step movement, i. e. the molds come to rest beneath the nozzles before the nozzle valves are opened and the pump operated to effect the discharge of batter. This necessarily slows down the speed of the machine. In some instances, however, the carrier moves continuously and the batter is given a quick injection into the mold cavities as they are passing beneath the nozzles but this results in the batter being spattered or placed unevenly in the cavities with the result that the cores frequently fail to complete the distribution of the batter in the mold cavities and the cones resulting have weak places or are not entirely filled out.

Further, with the nozzles located stationarily the speed of the machine is necessarily limited to allow sufficient "dwell" of the mold units in passing the charging station, either by coming to a standstill (step-by-step carrier) or by proceeding at a sufficiently slow speed to permit the charge to be squirted into the cavities as they pass beneath the nozzles.

My invention therefore has for its primary object to provide a charging mechanism so combined with the carrier that the carrier may be driven at almost any desired speed and yet each mold cavity will receive its proper charge at such a time as will, as nearly as practicable, insure the deposit of the batter in the centers of the cavities, i. e., the batter is deposited substantially along the longitudinal axis of the cavities into the bottom of the same.

Further, it is an object to provide a charging mechanism which may be located to one side of the machine out of the intense heat, the nozzles being normally withdrawn so as to avoid the intense heat over the molds from clogging the nozzles with hardened, heatthickened batter and thus enable a full free flow to take place at all times desired.

Further, the invention has for an object to provide a charging mechanism which includes a pump and delivery nozzle as a rigid unit, the unit being so mounted and timed for operation with respect to the carrier that the nozzles will be moved in an orbit-like path, first inwardly into position over the moving mold carrier in the line of travel thereof, then moved along with the carrier a determined distance during a portion of which the molds and nozzles move at approximately the same speed and the batter injection takes place, then moved outwardly out of position over the molds and back to one side of the machine, and then moved rearwardly to the starting place, the operation of recharging the pump and nozzles taking place during the recessional or return movement of the pump and its nozzles.

Other objects will in part be obvious and in part be referred to hereinafter.

To the attainment of the aforesaid objects and ends, my invention consists in the novel details of construction and in the combination, connection and arrangement of parts, hereinafter more fully fully described and then pointed out in the claims.

In the drawings:—

Figure 1 is a diagrammatic side elevation indicating the association of the invention with a mold carrier in a cone machine.

Figure 2 is an enlarged detail side elevation of one of the batter discharge nozzles.

Figure 3 is a face view of the batter pump.

Figure 4 is a diagrammatic indication of the four-way movement of the pump head.

Figure 5 is a plan view of the parts shown in Figure 3.

Figure 6 is a detail vertical section of one of the pump head valve bodies.

Figure 7 is a detail side elevation of the cam devices for shifting the pump head toward the travelling molds.

Figure 8:
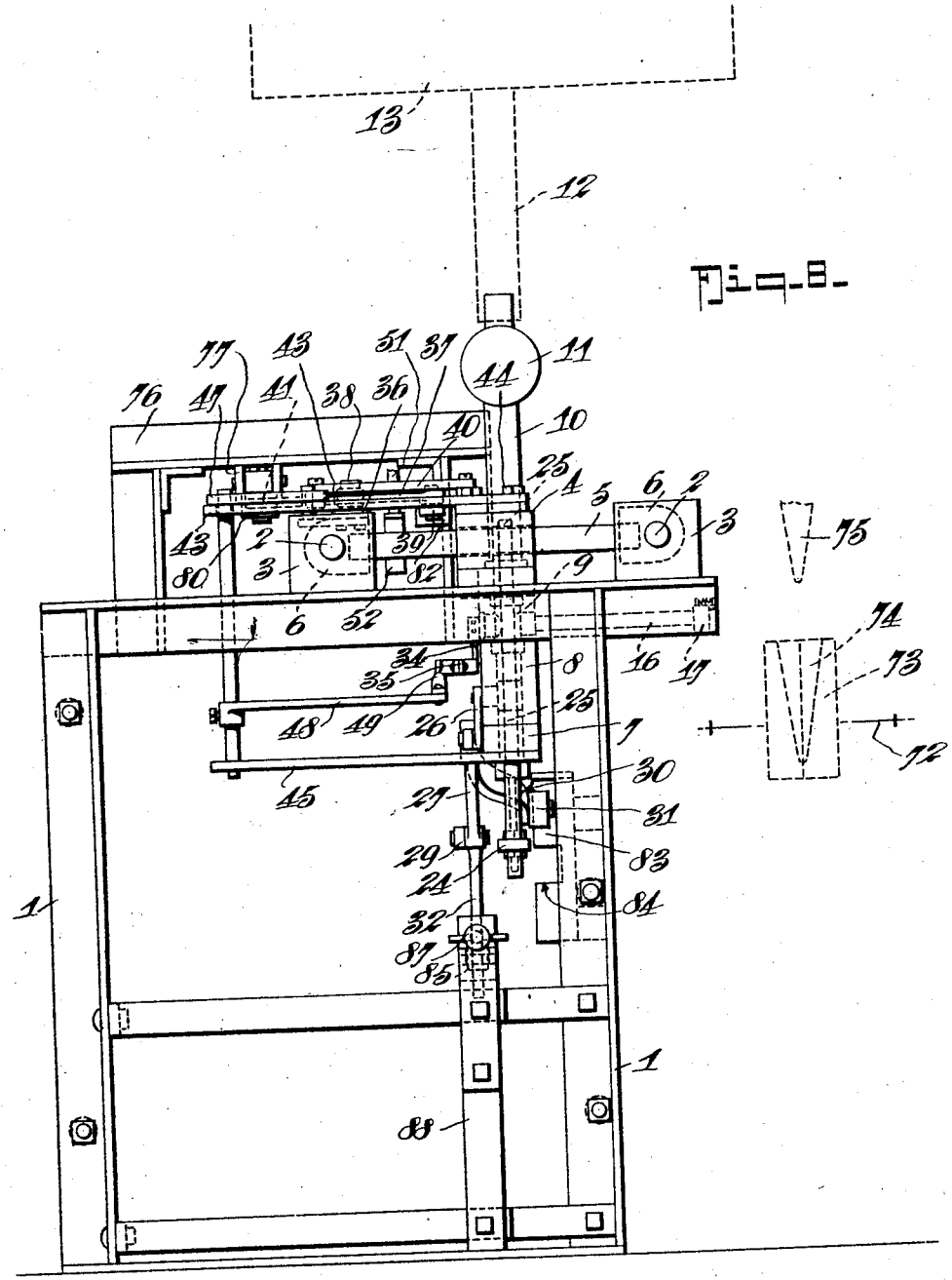
Figure 8 is an end view of the mechanism shown in Figures 3 and 5.

In the practical development of my improved mold charging batter pump mechanism I provide a suitable framing 1 on which a pair of parallel slide bars 2 are secured in bearings 3, see Figures 3, 5 and 8.

The pump head per se includes a pair of suitable slide heads 4 which are laterally slidable on guide rods 5 secured in slide arms 6 which are themselves longitudinally slidable on the rods 2.

The heads 4 form a part of a head frame consisting of horizontal frame bars 7 and connecting end bars 8. The bars 7 serve as mounting means for a plurality, one for each mold cavity, of control valves 9 which are fed by individual tubes 10 from a manifold 11 which is itself fed through flexible tubes 12 from a batter reservoir 13. Through their lower ends the valves 9 deliver into measuring cups or tubes 14 and through their side walls into discharge extensions 15. The valves are equipped with three-way valve members operable in such a way that passage of the batter is permitted from tubes 10 into tubes 14 and prevented from flowing into the extensions 15, or from tubes 14 into extensions 15 with the communication from the tubes 10 cut off for the purpose and in a manner later to be described.

Each valve 9 has one extension 15, and to each extension 15 a discharge tube 16 is connected, the said tubes 16 being equipped at their free ends with discharge heads or nozzles 17 each equipped with a closure flap 18 hinged at 19 in a vertical channel groove 20 and held closed by a spring 21, see Figures 3, 5 and 2.

A plunger 22 is vertically reciprocable in each measuring cup or tube 14 and the stems of the plungers are projected through the lower ends of the tubes 14 and threaded to receive adjustable clamp nuts 23 between which a cross head 24, common to all of the plungers, is adjustably secured. By reason of the provision of the common cross head 24 all of the plungers are actuated in unison in a manner later to be described, and by reason of the employment of the adjustable nuts 23 the positions of the plungers in their respective tubes may be individually adjusted.

The cross head 24 is secured at its ends to guide rods 25 which are vertically slidable through apertures provided therefor in the frame bars 7 and which are link connected at 26 to individual cranks 27, rockably mounted at 28 on the lowermost bar 7 and link connected as at 29 to move in unison.

One of the cranks 27 is provided with a crank extension 30 equipped with a cam roller 31 and the other crank 27 is provided with an arm extension 32, the purpose for which will later be described.

Each valve body 9 is equipped with a three-way valve member 33 and all of the said valve members have their stems connected by individual operating lever arms 34 to a common actuator bar 35 which, when moved in one direction or the other longitudinally, will serve to adjust the position of all of the valves simultaneously.

The outermost ones of the heads 6 are joined by a bar 36 on which a pair of bell cranks 37 are rockably mounted at 38. One pair of arms of the said bell cranks are link connected as at 39 to move in unison, and the other arms of the said cranks are connected by links 40 to the slide heads 4 so that when the said cranks are rocked the pump head proper will be moved back and forth laterally on the guide rods 5, see Figure 5.

One of the cranks 37 is provided with crank arm extensions 41 and the link 39 is extended at one end to provide an abutment extension 42, the purpose for which will later be described.

A bearing bar 43 is secured at 44 to one of the heads 4 and another such bar 45 is secured to the lower frame bar 7 and the said bars are extended to form suitable bearings for the vertical rock shaft 46. A crank 47 is secured to the upper end of the rock shaft and another crank 48 is secured to the said shaft near its lower end. The crank 48 is link connected at 49 to the common actuator bar 35 and the crank 47 is slot and pin connected at 50 to the bar 36. Thus when the pump head is moved laterally on the guide rods 5, the bar 36 being relatively stationary, the cranks 47 and 48 will be oscillated and the link connection 49 will impart a thrust or a pull on the actuator bar 35 to properly operate the valve members 33.

To provide for proper reciprocation of the whole pump structure I provide a pitman 51 which is connected at its free end as at 52 to one of the guide rods 5 forming part of the reciprocable pump frame, and the said pitman is connected at its other end to one arm of a bell crank 53 which has its other arm link-connected at 54 to a crank 55 secured on the end of a rotatable shaft 56 mounted in suitable bearings 57. Thus when the shaft 56 is rotated the pump mechanism will be reciprocated through the connections 55, 54, 53, 52 and 51.

Rotation is imparted to the shaft 56 by chain and sprocket connections 58 from the countershaft 59 mounted in suitable bearings 60, and the said shaft 59 is in turn rotated through sprocket and chain connections 61 from another countershaft 62 mounted in suitable bearings 63, and the last named countershaft 62 is rotated through sprocket and chain connections 64 from the power shaft 65 of the cone machine with which the pump mechanism is associated. The power shaft 65 may be rotated by belt and pulley connections 67 from any suitable source of power (not shown).

The ice cream cone machine is generally indicated at 68, it being understood that the indication of the said machine is diagrammatic only and that the pump mechanism herein disclosed may be employed in association with any machine having travelling mold units. In the diagrammatic showing of the machine 69 designates the operating shafts of the endless chain of molds and which are driven through worm connections 70 from the power shaft 65.

The end wheels for imparting movement to the endless chain of molding units are indicated at 71 and the endless chain of units at 72. The molds proper forming part of the travelling molding units are diagrammatically indicated at 73 and the cavities thereof at 74, the molding cores which assist the said cavities in shaping the product being indicated at 75, see Figures 1, 5 and 8. The pump frame is provided with an extension 76 to which a trough-like bearing member 77 is secured. In the member 77 a cam bar 78 is pivotally mounted as at 79 and the said bar is equipped at its free end with a cam roller 80 which lies in the path of movement of the crank arm extension 41, and by engagement with the said extension serves to rock the cranks 37 and move the pump head proper with the discharge nozzles toward the line of travel of the molding units.

The bar 78 is also provided with a deflector cam 81 which is engaged by the crank arm extension 41 on its return movement and serves to deflect the cam bar and roller upwardly out of the path of travel of the said extension, see Figures 3, 5 and 7. The pump head proper is returned from the position to which it has been moved by engagement of the crank arm extension with the cam roller 80 by engagement of the link abutment extension 42 with a fixed cam 82 secured to the framing, see Figures 3 and 5.

A stationary cam 83 is secured to the framing in position to be engaged by the cam roller 31 of the crank arm extension when the pump frame is moved to cause the said parts to engage, and serves to actuate the devices 27, 26, 25 and 24 to force home the plungers to discharge a measured quantity of batter at the proper time. The cam 83 may be provided with a cut-out 84 to free the roller 31 from engagement with the cam at the proper time.

To provide for proper return of the plungers to the lowered position and thereby effect a sucking in of a new charge of batter into the measuring cups 14, I provide a stationary cam roller 85 adapted to be engaged by the extension arm 32 on the return travel of the pump frame to reverse the movement of the parts effected by the cam 83.

The roller 85 is carried by a plate 86 adjustably mounted, through the screw device 87, upon a suitable carrying bracket 88.

In operation, the normal or non-charging position of the parts is as illustrated in Figures 3, 5 and 8 of the drawings, the relative positions of the discharge nozzles with the travelling molding units being diagrammatically indicated in the said Figures 5 and 8. The molds commonly employed in endless chain machines, especially those of the split mold type, have upward projections which would interfere with a fixed position of the discharge nozzles in proper relation to the mold cavities. Also, as the molds are constantly travelling, any discharge of batter from a stationary nozzle cannot be as efficient as desired. It is possible to inject batter axially into the mold cavities only from a nozzle which is in axial alignment with the cavity or cavities and travelling with the said cavities at substantially the same speed.

For the purposes above described I have so designed my improved charging mechanism that the pump nozzles will be moved laterally into proper alignment with the mold cavities, will be caused to travel substantially at the same speed and in axial alignment with the cavities during the charging action, then be returned laterally to their normal positions out of the way of the travelling mold unit and then returned to the position first mentioned. The path of movement of the pump head proper is diagrammatically illustrated in Figure 4 of the drawings, and in so moving the pump head and nozzles, engagement with projections from the mold is avoided and efficient charging of the cavities provided for.

In practice the mechanism for imparting reciprocation to the pump frame, namely the parts 51—59, are so constructed and arranged that the pump frame is reciprocated through a distance substantially equal the length of a molding unit or the equal space between said units so that each time the said head is reciprocated forwardly it will travel with a molding unit and on its return reciprocation will move into alignment with the succeeding molding unit.

In operation, as the pump head is reciprocated forwardly, (to the left in Figures 3 and 5) the crank extension 41 will engage the cam roller 80 and rock the cranks 37 to move the pump head proper laterally toward the molding unit to bring the discharge nozzles 17 into axial alignment with and above the molding cavities. This lateral movement of the pump head proper will effect a rocking of the cranks 47 and 48 and a movement of the valve members 33 to the position illustrated in Figure 6 of the drawings. Continued movement of the pump frame will cause the cam roller 31 to engage the cam 83 and the cranks 27 will be rocked to force the plungers upwardly, and as the valve members are positioned as illustrated in Figure 3 of the drawings measured charges of batter will be ejected from the nozzles 17 axially into the molding cavities.

After the actual charging has taken place the link extension 42 engages the fixed cam 82 and reversely rocks the cranks 37 to return the pump head proper to its normal retracted position. The return lateral movement of the pump head proper serves to rock the cranks 47 and 48 and effect a change of position of the valves 33 from that illustrated in Figure 6 of the drawings to a position where communication between the delivery tubes 10 and the measuring cups 14 will be opened and communication with the extensions 15 and delivery nozzles closed.

By this time the longitudinally reciprocable pump frame will have been moved forwardly to its limit by the pitman 51 and return movement thereof will start. As the frame moves in the opposite direction the extension 41 of the crank 37 will engage the deflector cam 81 and move the roller 80 out of the way, and as the crank extension 32 strikes the cam roller 85 the plungers 22 will be forced down to their normal position sucking a measured charge of batter into the tubes or measuring cups 14. By adjusting the position of the roller 85 through the screw connections 87 the position of contact and consequently the stroke of the plungers may be varied.

The shaft 56 is preferably provided with a clutch mechanism of any suitable type generally designated 89 by which the driven sprocket on that shaft may be permitted to rotate freely on the said shaft or clutched into rotative relation with the countershaft 59. Thus when the clutch 89 is thrown out the whole pump mechanism is thrown out of operation and will remain at rest in its frame.

At times it may be desired to temporarily cut out the batter ejection without cutting out the whole pump operation. This may be accomplished by lifting the cam roller carrying bar 78 on its pivot and inserting a supporting piece across the trough-like member 77 beneath the said bar as indicated in Figure 7 to hold the said bar elevated in ineffective position.

From the foregoing description, taken in connection with the accompanying drawings, it is thought that the novel details of construction, the manner of use and the advantages of my invention will be readily apparent to those skilled in the art to which it relates.

What I claim is:

1. In a pastry making machine, a mold carrier operating in an endless path; a batter charging mechanism comprising a nozzle, means to supply material to said nozzle, means mounting said charging mechanism to one side of the carrier and out of the path of travel of the molds; means to impart motion to said nozzle to cause it to move first inwardly into position over the molds, and in the line of travel thereof, then move along with the molds in the direction of their travel, then move outwardly away from the path of travel of the molds, and then move backwardly outside of the path of travel of the molds to the starting place, and means to release the charge of material to the molds while nozzle and mold are travelling along together.

2. In pastry making machines, a continuously moving mold carrier operating in a circuit, with molds having cavities mounted on the carrier and travelling therewith; a charging mechanism including a nozzle, means to supply a charge of material to said nozzle and to effect discharge of material from said nozzle, means causing said nozzle to undergo motion in four directions, namely starting from a point outside the path of travel of the molds inwardly to a position over the molds, then along with the molds in the direction of their travel, then outwardly away from the path of travel of the molds and finally back again outside the path of travel of the molds to the starting point; and means to operate said nozzle to deposit the charge during the interval nozzle and mold travel together and to re-supply the nozzle with material during a part of the remaining travel of the nozzle.

3. In pastry making machines, a continuously moving mold carrier operating in a circuit, with molds having cavities mounted on the carrier and travelling therewith; a charging mechanism; means mounting said charging mechanism to one side of the path of travel of the molds; said charging mechanism comprising a pump and at least one charging nozzle carried thereby; means to impart an orbit-like movement to said charging mechanism and during a portion of said movement cause the nozzle to be located above the line of travel of the molds and move with the molds in the direction of travel thereof, and means to release the charge during said portion of movement.

4. In pastry making machines, a continuously moving mold carrier operating in a circuit, with molds having cavities mounted on the carrier and travelling therewith; a charging mechanism; means mounting said charging mechanism to one side of the path of travel of the molds; said charging mechanism comprising a pump and at least one charging nozzle carried thereby; means to move said charging mechanism inwardly and outwardly to position the nozzle over the molds in the line of travel thereof and retract the nozzle therefrom; and means to cause the nozzle to move along the path of travel of the molds together with the molds and during a definite interval of which movement cause the nozzle to travel at approximately the speed of the carrier and in the same direction; and means effective during said interval for depositing the charges of batter in the molds.

5. In a pastry making machine, a mold carrier operating in an endless path, a batter charging mechanism comprising a supporting frame, a pump frame longitudinally slidable on the supporting frame, a pump head laterally slidable on the pump frame and including at least one discharge nozzle, means to supply batter to the pump head, means to longitudinally reciprocate the pump frame on the supporting frame, means to laterally reciprocate the pump head on the pump frame to bring the nozzle in register with the mold carrier at intervals, and means to eject batter from the nozzle during the nozzle and mold carrier registering intervals.

6. The combination with a continuously moving chain of mold units, of a charging mechanism to charge the molds comprising a pump head, a framing, means associated in timed relation to the travel of the mold units to cause the pump head to travel in four directions one of which is coincident to the travel of the mold units, said pump head having a discharge nozzle, a control valve and a measuring tube associated with the nozzle and the valve, plungers in the measuring tubes and means operable during the respective directional movements to first set the valve to permit discharge, then actuate the plungers to force a measured quantity of batter from the measuring tube through the nozzle, then reset the valve to enable replenishing of supply of batter in the measuring tube, and finally to return the plungers to the normal position and suck in a new charge of batter.

7. In a pastry making machine, a mold carrier operating in an endless path; a batter charging mechanism comprising a nozzle, means to supply material to said nozzle, means mounting said charging mechanism to one side of the carrier and out of the path of travel of the molds; means to impart motion to said nozzle to cause it to move first inwardly into position over the molds, and in the line of travel thereof, then move along with the molds in the direction of their travel, then move outwardly away from the path of travel of the molds, and then move backwardly outside of the path of travel of the molds to the starting place, and means to forcibly eject a measured quantity of material from the nozzle while nozzle and mold are travelling along together.

8. In combination with a travelling mold carrier and molds thereon; a charging mechanism located to one side of the carrier and comprising a batter ejector having a discharge outlet, means to deliver batter to the ejector and means to move said ejector from its position at one side of the carrier to position the discharge outlet over the cavity of a mold at one place and cause the same to travel with the mold a limited distance, and means for operating said ejector while the outlet is travelling with the mold.

9. In combination with a travelling mold carrier; a charging mechanism, said mechanism including a pump head located to one side of the carrier and equipped with control valves, plungers to draw in and expel measured quantities of batter and delivery ducts to deliver the expelled batter to the molds; means to move the pump head from its position at one side of the carrier into register with a mold unit and cause it to travel with said mold unit during an interval of time, and means to actuate the valves during said interval of time to discharge the batter into the molds.

10. In batter charging mechanism, a pump head comprising a frame, a series of valves carried by the frame, a batter reservoir, means to deliver batter from the reservoir to the valves, measuring tubes communicating with the valves, delivery ducts communicating with the valves, means to adjust the valves to open communication from the batter delivering means to the measuring tubes and close communication to the delivery ducts or to open communication from the measuring tubes to the delivery ducts and close off communication to the delivery means, means to forcibly eject a measured quantity of batter from the measuring tubes through said delivery ducts, said last named means comprising plungers reciprocable in the measuring tubes, a cross head common to all of the plungers, means to move the cross head, means to individually-adjustably secure the plungers to the cross head, means to move the pump head frame to cause the delivery ducts to travel in a predetermined line and at a predetermined speed at intervals, and means operable during movement of the said frame to actuate and return the valves and actuate and return the plungers for the purpose described.

11. In a pastry making machine, a mold carrier operating in an endless path; a batter charging mechanism comprising a supporting frame, a pump frame longitudinally slidable on the supporting frame, a pump head laterally slidable on the pump frame; said pump head including control valves, plungers to draw in and expel measured quantities of batter and delivery ducts to deliver the expelled batter to the molds; crank and link devices carried by the pump frame and connected to the pump head to move it laterally at intervals; means to longitudinally reciprocate the pump frame on the supporting frame, stationary abutments engaged by the crank and link devices during reciprocation of the pump frame to effect lateral sliding of the pump head, means operative during lateral sliding of the pump head to actuate the valves, and stationary cams and means to engage them during reciprocation of the pump frame to actuate the plungers.

12. In combination with a travelling mold carrier; a charging mechanism to charge the carried molds at intervals; said mechanism including a pump head equipped with control valves, plungers to draw in and expel measured quantities of batter, and delivery ducts to deliver the expelled batter to the molds; means to move the pump head longitudinally and laterally at intervals to move in register with a particular mold during an interval; means to actuate the valves during the lateral movements of the pump head, and means to actuate the plungers during the longitudinal movements of the pump head for the purpose described.

13. In a pastry making machine, a mold carrier operating in an endless path; a batter charging mechanism comprising a supporting frame, a pump frame longitudinally slidable on the supporting frame, a pump head laterally slidable on the pump frame; said pump head including control valves, plungers to draw in and expel measured quantities of batter and delivery ducts to deliver the expelled batter to the molds; crank and link devices carried by the pump frame and connected to the pump head to move it laterally at intervals; means to longitudinally reciprocate the pump frame on the supporting frame, stationary abutments engaged by the crank and link devices during reciprocation of the pump frame to effect lateral sliding of the pump head, means operative during lateral sliding of the pump head to actuate the valves, and stationary cams and means to engage them during reciprocation of the pump frame to actuate the plungers, one of said lateral sliding effecting abutments being pivotally mounted whereby it may be displaced without removal for the purpose specified.

14. In a pastry making machine, a mold carrier operating in an endless path; a batter charging mechanism comprising a supporting frame, a pump frame longitudinally slidable on the supporting frame, a pump head laterally slidable on the pump frame; said pump head including control valves, plungers to draw in and expel measured quantities of batter and delivery ducts to deliver the expelled batter to the molds; crank and link devices carried by the pump frame and connected to the pump head to move it laterally at intervals; means to longitudinally reciprocate the pump frame on the supporting frame, stationary abutments engaged by the crank and link devices during reciprocation of the pump frame to effect lateral sliding of the pump head, means operative during lateral sliding of the pump head to actuate the valves, stationary cams and means to engage them during reciprocation of the pump frame to actuate the plungers, means to individually adjust the positions of the plungers, and means to adjust the stroke of the plungers collectively.

EDWIN KLAHN.